United States Patent
Caesar, Jr. et al.

(10) Patent No.: US 8,036,245 B2
(45) Date of Patent: Oct. 11, 2011

(54) SYSTEM AND METHOD FOR PACKET BASED COMMUNICATIONS AND ARRANGEMENT THEREFOR

(75) Inventors: Robert J. Caesar, Jr., Berkeley Lake, GA (US); Sam C. Wood, Suwanee, GA (US)

(73) Assignee: ST-Ericsson S.A., Plan-les-Ouates (CH)

( * ) Notice: Subject to any disclaimer, the term of this patent is extended or adjusted under 35 U.S.C. 154(b) by 132 days.

(21) Appl. No.: 12/495,535

(22) Filed: Jun. 30, 2009

(65) Prior Publication Data

US 2009/0323547 A1    Dec. 31, 2009

Related U.S. Application Data

(60) Provisional application No. 61/076,957, filed on Jun. 30, 2008.

(51) Int. Cl.
*H04J 3/16* (2006.01)

(52) U.S. Cl. ........................................ 370/471; 370/473

(58) Field of Classification Search ................. 370/389, 370/395.42, 395.43, 395.41, 455, 473, 487, 370/493, 471
See application file for complete search history.

(56) References Cited

U.S. PATENT DOCUMENTS 6,735,219 B1 * 5/2004 Clauberg ...................... 370/474
* cited by examiner

*Primary Examiner* — Brenda Pham
(74) *Attorney, Agent, or Firm* — Howison & Arnott, L.L.P.

(57) ABSTRACT

A system and method for packet-based communications is performed by implementing arbitrated packet-based communications. According to an example embodiment, packet-based data is arbitrated and output with verification data. For each arbitrated packet stream, verification data is generated in response to detecting an end of frame (EOF) symbol in the arbitrated packet stream, and the verification data is added to the packet stream. A merged packet stream is provided at an output, the merged packet stream including the plurality of arbitrated packet streams with verification data added thereto.

20 Claims, 3 Drawing Sheets

SYSTEM AND METHOD FOR PACKET BASED COMMUNICATIONS AND ARRANGEMENT THEREFOR

CROSS-REFERENCE TO RELATED APPLICATION(S) AND CLAIM OF PRIORITY

The present application claims priority under 35 U.S.C. §119(e) to U.S. Provisional Patent No. 61/076,957, filed Jun. 30, 2008, entitled "PACKET-BASED COMMUNICATIONS AND ARRANGEMENT THERFOR", and which is hereby incorporated by reference into the present application as if fully set forth herein.

TECHNICAL FIELD

The present application relates generally to packet-based communications, and more particularly, to the implementation of arbitrated packet-based communications and devices employing the same.

BACKGROUND

Packet-based communication protocols are widely used for a multitude of different types of communications. These protocols often use a Cyclic Redundancy Check (CRC) value that is transmitted along with each packet so that the packet can be verified (via the CRC) by a device receiving the packet, helping to insure the integrity of the data contained in the packet. For packets with a non-trivial length, devices transmitting these packets incrementally compute the CRC value as the device processes each data element of the packet. After the last data element of the packet is processed, the resulting CRC value is a nearly unique value representing the contents of the packet.

The CRC usually is transmitted at the end of the packet. A device receiving a packet can perform the same CRC computation on the incoming packet and verify that the computed CRC matches the transmitted CRC value received with the packet to ensure that the packet data was not corrupted during transmission. If the computed CRC does not match the received CRC value, then the data is determined to be corrupted and an error recovery mechanism is generally employed.

A variety of different protocols are implemented in connection with packet-based communications. Some protocols, such as Mobile Industry Processor Interface (MIPI) UniPro or PCI Express, support several independent packet streams to be transmitted over a shared physical link. Arbitration between the streams is often used to ensure that complete, uninterrupted packets are sent over the link, or to ensure that higher priority packets interrupt lower priority packets (i.e., preemption) as allowed in MIPI UniPro. The receiving device is notified of preemption through the framing symbols around the packet.

A pair of packets where a high priority packet preempts a lower priority packet might be signaled with the sequence illustrated in FIG. 4B.

The CRC computation may cover all framing symbols and data elements as does MIPI UniPro.

While useful for a variety of packet-based communications, various issues have presented challenges to these approaches. For instance, packet streams from different priority classes may be pipelined in hardware so that the CRC may be computed on the data elements prior to presenting the data element to the packet arbiter. When the arbiter switches to a different packet stream, the interrupted packet may be required to insert a COF symbol which may be included in the CRC computation. If the CRC computer has already processed the data elements that are immediately after the COF, the computer must "undo" the last CRC computation or restore an old CRC value, then process the COF symbol and continue with the packet. This "undo" to insert a COF symbol generally causes a delay or requires additional storage elements. If the extra delay in the low priority packet is avoided by cleanly inserting the COF earlier in the pipeline, the higher priority packet is delayed while the data elements which have already contributed to the CRC computations in the lower priority packet pipeline can be transmitted.

These delays, additional required storage elements and other related characteristics of CRC-based packet communications have continued to present challenges to packet-based communications as well as devices and systems employing the same.

SUMMARY

Aspects of the present disclosure are directed to overcoming the above-mentioned challenges and others related to the types of applications discussed above and in other applications. These and other aspects of the present disclosure are exemplified in a number of illustrated implementations and applications, some of which are shown in the figures and characterized in the claims section that follows.

According to some embodiments, packet-based communications are carried out using an arbitration and verification approach. Incoming packets are arbitrated according to an arbitration condition, and an arbitrated packet stream is output. The arbitrated packet stream is monitored to detect the traffic class of the packet stream. In response to detecting an arbitrated packet stream having a matching class, the detected packet stream is monitored for an end of frame (EOF) symbol. When an EOF symbol is detected for a detected packet stream, verification data is generated for and added into the detected packet stream. A merged packet stream, including the detected packet stream with the verification data added thereto, is output and provided for receipt at a receiving device.

According to additional and alternative embodiments, a system for communicating packet-based data arbitrates and communicated packet streams with verification data. The system includes a packet arbiter that arbitrates incoming packets according to an arbitration condition, and that outputs an arbitrated packet stream. A traffic class monitor monitors the arbitrated packet stream to detect the traffic class of the packet stream and, in response to detecting an arbitrated packet stream having a matching class, monitors the detected packet stream for an end of frame (EOF) symbol. When an EOF symbol is detected (e.g., indicating all packets have been included), a verification data generator generates verification data for the detected packet stream. An output circuit adds the verification data into the detected packet stream and outputs a merged packet stream including the detected packet stream with the verification data added thereto.

According to yet additional and alternative embodiments, a plurality of packet streams are communicated, by a transmitter arrangement, with verification data for use in verifying the packet streams when received at a receiver arrangement. Prior to generating verification data (e.g., verification data is generated in a single pass), the plurality of packet streams are arbitrated. For each of the plurality of arbitrated packet streams, verification data is generated in response to detecting an end of frame (EOF) symbol in the arbitrated packet stream, and the verification data is added to the packet stream. A merged packet stream, including the plurality of arbitrated packet streams with verification data added thereto, is output and provided for use at a receiver.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
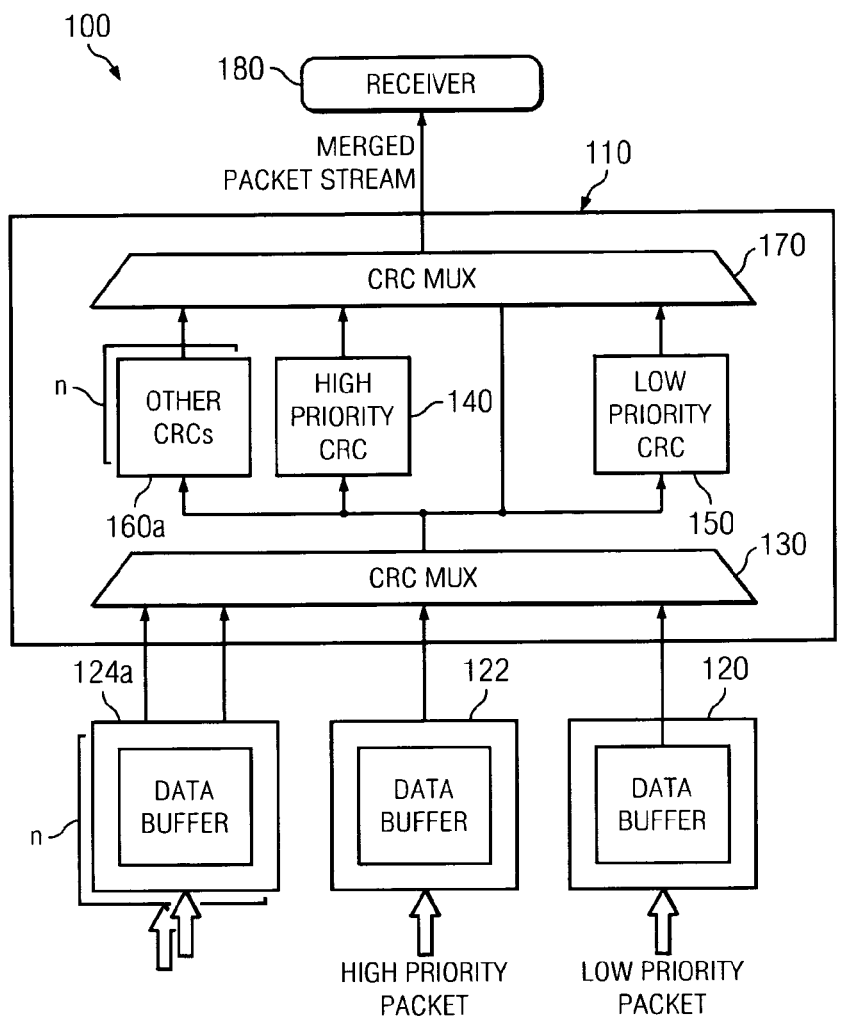
FIG. 1 illustrates a system and approach for packet-based communications according to embodiments of the present disclosure.
Figure 4A:
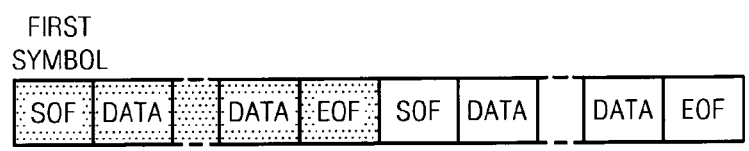
FIGS. 4A and 4B illustrate example packet sequences.
Figure 4B:
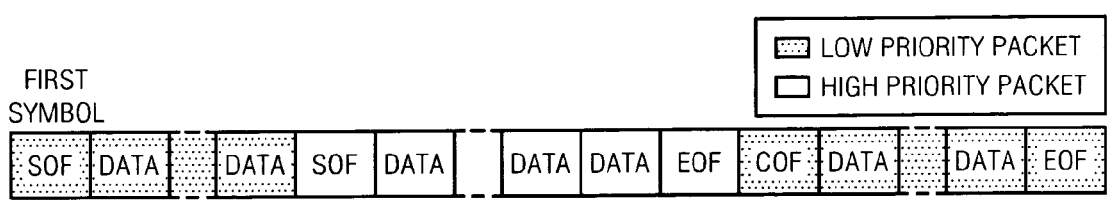
Figure 2:
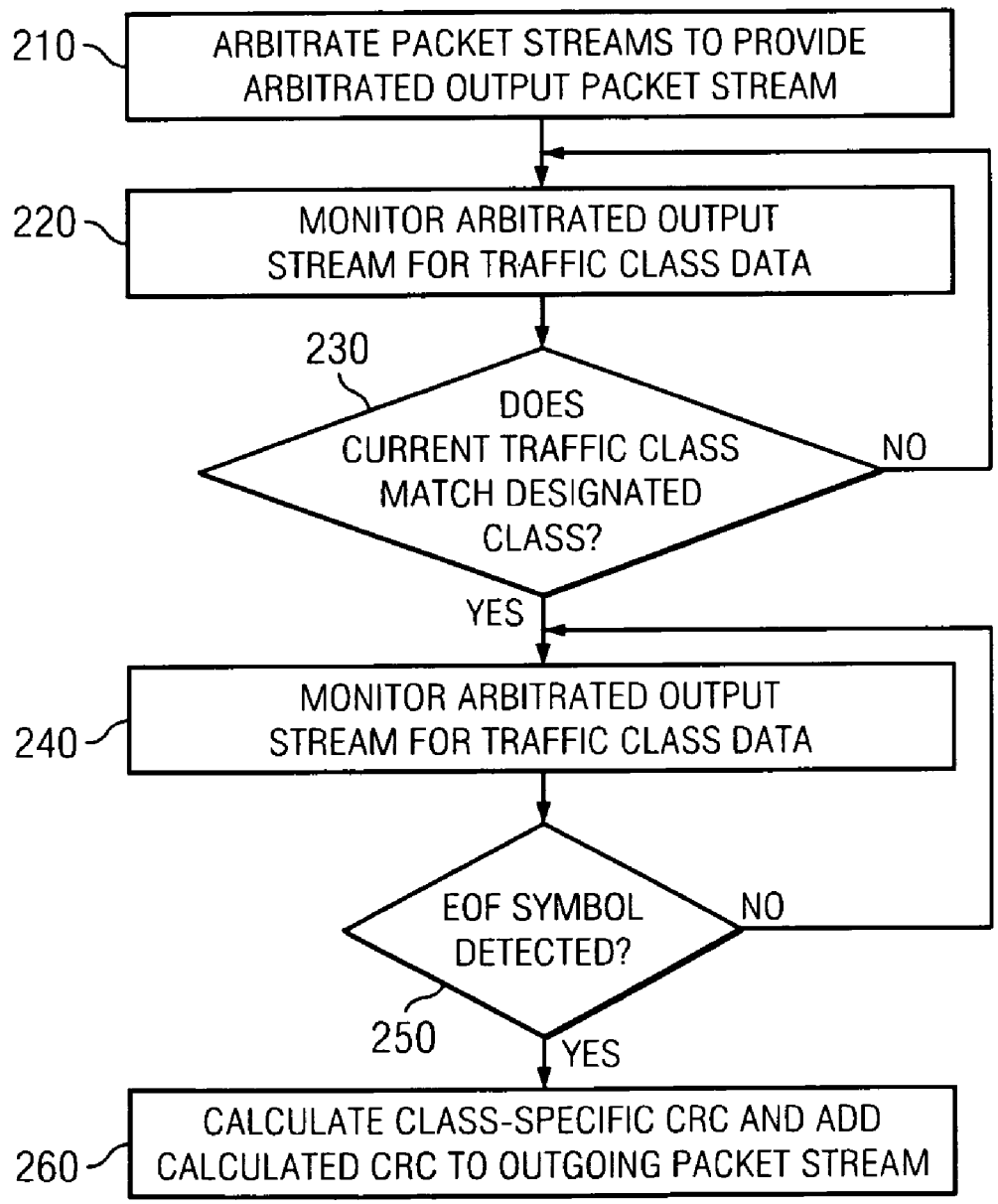
FIG. 2 illustrates a method for packet-based communications according to embodiments of the present disclosure.
Figure 3:
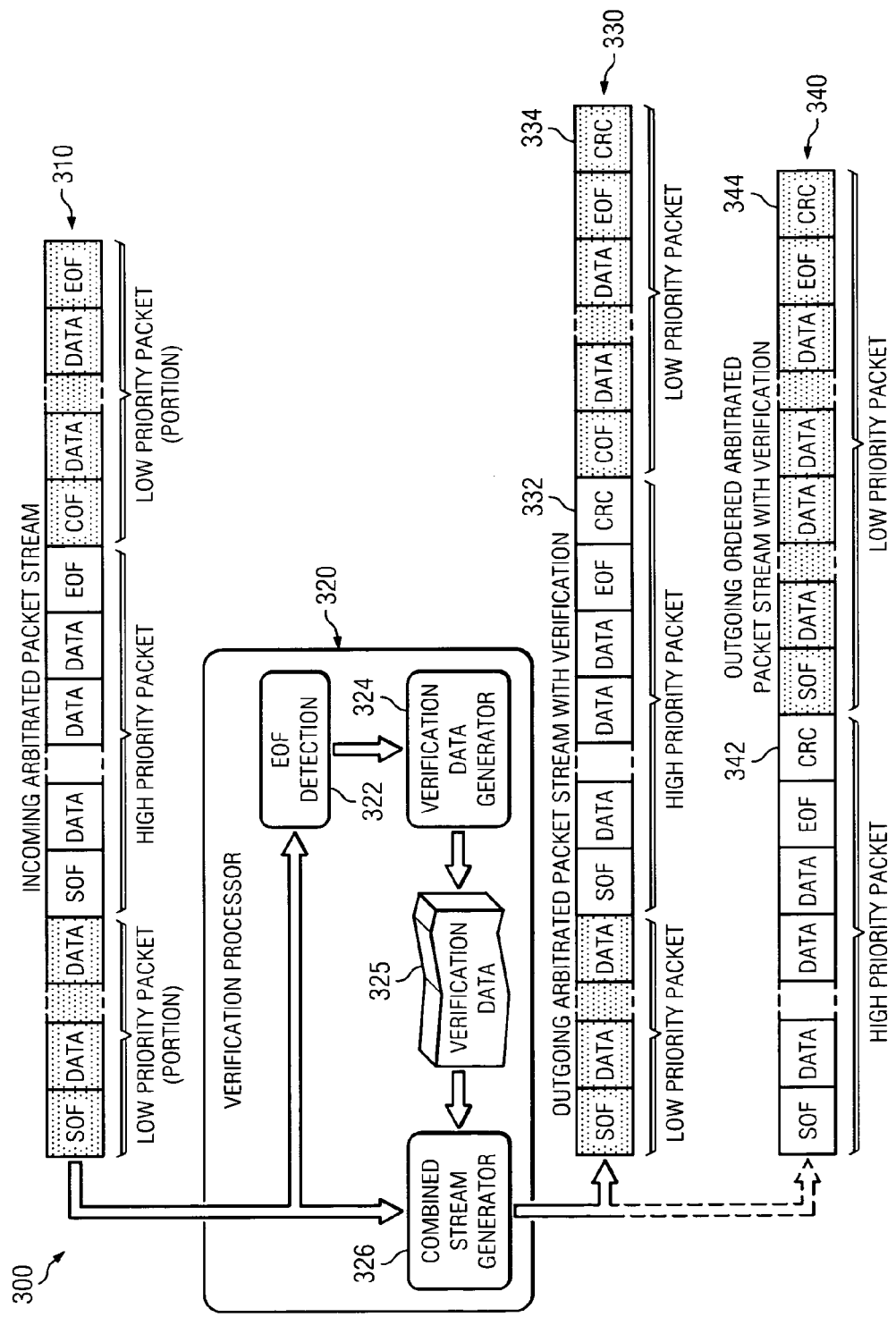
FIG. 3 illustrates a system and related approach for packet arbitration and verification.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged packet-based communications.

Embodiments of the present disclosure are applicable to a variety of packet-based communications and systems, and particularly applicable to priority-based packet communication approaches. While the disclosed embodiments are not necessarily limited to such applications, an appreciation of various aspects of the invention is best gained through a discussion of examples in such an environment.

According to an example embodiment, a packet-based communications approach involves the computation of validation values, such as CRC values, for packets after the packets have gone through an arbitration step. The computed validation values are added to an outgoing packet stream for use by devices receiving the packet.

In additional and alternative embodiments, packet-based communications are carried out as follows. Packet streams are processed using an arbitration approach to ensure that higher priority packets interrupt lower priority packets (i.e., to effect preemption) and/or to ensure that complete, uninterrupted packets are sent over a communications link. An arbitration output is monitored for end-of-frame (EOF) symbols in different traffic classes. In response to detecting an EOF symbol for a packet in a particular traffic class, a traffic class-specific CRC value is computed for that packet and injected into the output stream for the packet for integrity verification by a receiving device. In some embodiments, a CRC value is computed after packet arbitration for preempting traffic class packet streams without undoing previous CRC computations (e.g., as may be caused by a COF symbol being inserted into the packet stream, discussed above).

In yet additional and alternative embodiments, a packet-based communications system includes an arbiter and a separate CRC computational unit for each traffic class via which packet streams are processed. Each traffic class CRC computational unit monitors the output of the packet arbiter and processes framing symbols and data elements for its traffic class. When the CRC computational unit detects an EOF symbol for a packet stream in its traffic class, the CRC computational unit injects a computed CRC value into the output stream (after packet arbitration). Where preemption is carried out, it can be done without necessarily undoing previous CRC computations, and the CRC value can be computed with knowledge of the preemption sequence.

FIG. 1 illustrates a system 100 and approach for packet-based communications, according to some embodiments. The system 100 includes a packet arbitration and verification processor 110 (e.g., a transmitter device) that arbitrates incoming packets, generates verification information for the packets and generates a merged packet stream output that is provided to a receiver 180 over a packet-based communications link. Data buffers 120, 122 and 124a-n feed the processor 110 with packet data, with buffers 120 and 122, respectively, shown (by way of example) as supplying low priority packets and high priority packets.

The processor 110 includes an arbiter 130, high priority CRC generator 140, low priority CRC generator 150, and other (160a-n) CRC generators, and a CRC multiplexer 170. The 160a-n CRC generators generate CRC values according to other conditions, such as for intermediate priority levels between high and low priority levels.

Each of the CRC generators 140, 150 and 160a-n monitor the output of the arbiter 130 for packet streams having a class (e.g., a priority or other condition) for which the CRC generator is programmed to provide a CRC value. Using CRC generator 140 as an example, when one of the CRC generators detects a packet stream having a predetermined corresponding class, the CRC generator monitors the output of the arbiter 130 for an end of file (EOF) symbol or other information that is indicative of an appropriate position at which to insert a CRC value. Upon detection of the EOF symbol (or related information), the CRC generator generates a CRC value and inserts that value into the packet stream. The packet stream, with the CRC value, is output to the CRC multiplexer 170 which combines packet streams from all of the CRC generators 140, 150 and 160a-n to provide a merged packet stream output to the receiver 180. Upon receipt of the packet stream, the receiver 180 calculates appropriate CRC values and uses the calculated values to determine a condition of the received packets (e.g., to determine a condition of the packets, such as those relating to validity or completeness).

FIG. 2 illustrates a method for packet-based communications according to embodiments of the present disclosure. At block 210, packet streams are arbitrated in accordance with one or more arbitration approaches to provide an arbitrated output packet stream. The arbitrated packet stream is monitored for traffic class data at block 220, using one or more CRC generators designated for generating validation (e.g., CRC values) corresponding to a designated class.

In the event that a current traffic class matches a monitored class for a particular CRC generator at block 230, that particular generator monitors the arbitrated packet stream for an EOF symbol at block 240. In the event that an EOF symbol is detected at block 250, the particular generator calculates a class-specific CRC value and adds the calculated CRC value to the arbitrated packet stream. The arbitrated packet stream is then provided, together with the added CRC value, as an output.

FIG. 3 illustrates a system 300 and related approach for packet arbitration and verification according to embodiments of the present disclosure. An incoming arbitrated packet stream 310 is received and processed at a verification processor 320. By way of example and not limitation, the packet stream 310 is shown as having a high priority packet interrupting a lower priority packet, with a Continuation of Frame (COF) symbol used to signal the interruption of the low-priority packet.

An EOF detection function monitors received packet streams for an EOF symbol. For each detected EOF symbol, a verification data generator 324 generates verification data 325, such as, but not limited to, CRC data, in response to the detection of an EOF symbol. In this context, the verification data can be generated in a single pass after packet framing symbols (e.g., final EOF) have been included, mitigating any need to recalculate or undo/remove earlier verification data generation.

A combined packet stream generator 326 combines the generated verification data 325 with the incoming packet stream 310 to generate an outgoing packet stream. In one embodiment, an outgoing packet stream 330 is generated with verification data added or appended at the end of each packet using the interrupted stream 310 as received. In another embodiment, the combined packet stream generator 326 may re-order the packets to provide a complete, uninterrupted packet stream 340. Thus, FIG. 3 illustrates two possible outgoing arbitrated combined data streams with verification. In either embodiment, verification data shown by way of example as CRC data is inserted at the end of each packet. For packet stream 330, CRC data 332 and 334 is inserted for the high priority and low priority packets respectively. Additionally, for packet stream 340, CRC data 342 and 344 is inserted for the high priority and low priority packets respectively.

In some embodiments, the verification processor 320 processes packets according to a class type of the received packets, and generates verification data 325 according to the class type of the packet for which the verification data is generated. This approach may be implemented using, for example, a system 100 as shown in FIG. 1 involving multiple CRC (or other verification) generators at 324, with an output multiplexed at 326.

The arrangements and approaches described herein are implemented using one or more of a variety of circuits and approaches. For example, the processor 110 shown in FIG. 1 and/or the verification processor 310 illustrated in FIG. 3 can be implemented with a digital circuit that processes some CRC-protected packets that preempt other packets and cause additional packet framing symbols to be included in the CRC. In some embodiments, such an approach can be implemented with the MIPI UniPro protocol.

The various embodiments described above and shown in the figures are provided by way of illustration only and should not be construed as limiting. Based on the above discussion and illustrations, those skilled in the art will readily recognize that various modifications and changes may be made without strictly following the exemplary embodiments and applications illustrated and described herein. For example, other types of validation generators may be used in addition to and/or in place of the shown CRC and other generators. In addition, a variety of arbitration approaches can be used, together with corresponding CRC generation, to suit different applications and needs. The shown and described embodiments are applicable for use with a variety of communications protocols, such as the MIPI UniPro protocol and PCI Express. Also, the various processing approaches described herein can be implemented using a variety of devices and methods including general purpose processors implementing specialized software, digital signal processors, programmable logic arrays, discrete logic components and fully-programmable and semi-programmable circuits such as PLAs (programmable logic arrays). For example, in some applications, the packet arbitration and verification processor 110 in FIG. 1, and/or the verification processor 320, is a processor or controller programmed to carry out the indicated functions. Such modifications and changes do not depart from the true scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for packet-based communications, the method comprising:
   arbitrating incoming packets according to an arbitration condition and outputting an arbitrated packet stream;
   monitoring the arbitrated packet stream to detect the traffic class of the packet stream;
   in response to detecting an arbitrated packet stream having a matching class, monitoring the detected packet stream for an end of frame (EOF) symbol;
   in response to detecting an EOF symbol for a detected packet stream, generating verification data for the detected packet stream and adding the verification data into the detected packet stream; and
   outputting a merged packet stream including the detected packet stream with the verification data added thereto.

2. The method of claim 1, wherein generating verification data includes generating cyclic redundancy check data.

3. The method of claim 1, wherein generating verification data includes generating verification data for each arbitrated packet stream as a function of the class of the arbitrated packet stream.

4. The method of claim 1, wherein generating verification data includes generating verification data for preempting traffic class packet streams in a single pass, after the final packet framing symbols have been included in the packet stream for which the verification data is generated.

5. The method of claim 1, wherein generating verification data includes generating verification data for preempting traffic class packet streams without undoing previous CRC computations.

6. The method of claim 1, wherein arbitrating incoming packets according to an arbitration condition includes arbitrating incoming packets according to a priority assigned to each incoming packet, with higher priority packets preempting lower priority packets.

7. The method of claim 1, wherein arbitrating incoming packets according to an arbitration condition, and outputting a merged packet stream includes outputting complete, uninterrupted packets.

8. A system for communicating packet-based data, the system comprising:
a packet arbiter to arbitrate incoming packets according to an arbitration condition and to output an arbitrated packet stream;
a traffic class monitor to monitor the arbitrated packet stream to detect the traffic class of the packet stream and, in response to detecting an arbitrated packet stream having a matching class, monitoring the detected packet stream for an end of frame (EOF) symbol;
a verification data generator responsive to the detection of an EOF symbol for a detected packet stream by generating verification data for the detected packet stream; and
an output circuit to add the verification data into the detected packet stream and output a merged packet stream including the detected packet stream with the verification data added thereto.

9. The system of claim 8, wherein the arbiter, monitor, generator and output circuit are implemented on an integrated circuit device.

10. The system of claim 8, wherein the arbiter, monitor, generator and output circuit are implemented in a computer.

11. The system of claim 8, wherein the verification data generator generates verification data including cyclic redundancy check data.

12. The system of claim 8, wherein the verification data generator generates verification data for each arbitrated packet stream as a function of the class of the arbitrated packet stream.

13. The system of claim 8, wherein the verification data generator generates verification data for preempting traffic class packet streams in a single pass, after final packet framing symbols have been included with the packet stream for which the verification data is generated.

14. The system of claim 8, wherein the verification data generator generates verification data for preempting traffic class packet streams without undoing previous cyclic redundancy check computations.

15. The system of claim 8, wherein the packet arbiter arbitrates incoming packets according to an arbitration condition by arbitrating incoming packets according to a priority assigned to each incoming packet, with higher priority packets preempting lower priority packets.

16. The system of claim 8, wherein the output circuit outputs an arbitrated packet stream by outputting complete, uninterrupted packets with the verification data included therewith.

17. The system of claim 8, wherein the system includes one of said traffic class monitors for each of a plurality of traffic classes, each traffic class monitor adapted to monitor a detected packet stream for a traffic class and including one of said verification data generators to generate verification data for a detected packet stream for the monitored traffic class, and
the output circuit includes a multiplexer to combine packet streams for each traffic class.

18. A method for communicating, from a transmitter, a plurality of packet streams with verification data for use in verifying the packet streams when received at a receiver, the method comprising:
prior to generating verification data, arbitrating the plurality of packet streams;
for each of the plurality of arbitrated packet streams,
in response to detecting an end of frame (EOF) symbol in the arbitrated packet stream, generating verification data for the packet stream, and
adding the verification data to the packet stream; and
outputting a merged packet stream including the plurality of arbitrated packet streams with verification data added thereto.

19. The method of claim 18, wherein the step of generating verification data includes, for each of a plurality of traffic classes, using a class-specific cyclic redundancy check (CRC) computational unit to generate cyclic redundancy check verification data for packets in the traffic class.

20. The method of claim 18, wherein outputting a merged packet stream including the plurality of arbitrated packet streams with verification data added thereto includes outputting complete, uninterrupted packets.

* * * * *